April 15, 1924.  1,490,218
C. S. KNAPP
EQUALIZER MOUNTING FOR CAR TRUCKS
Filed April 2, 1920
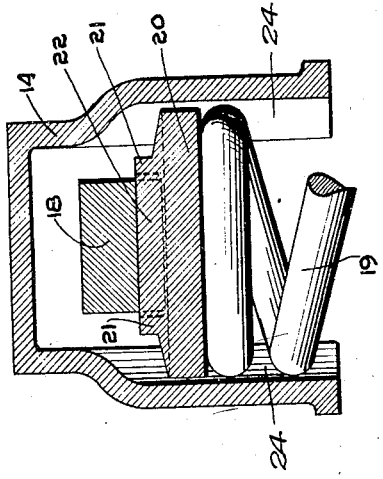
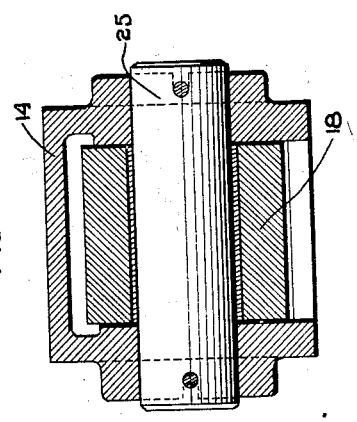
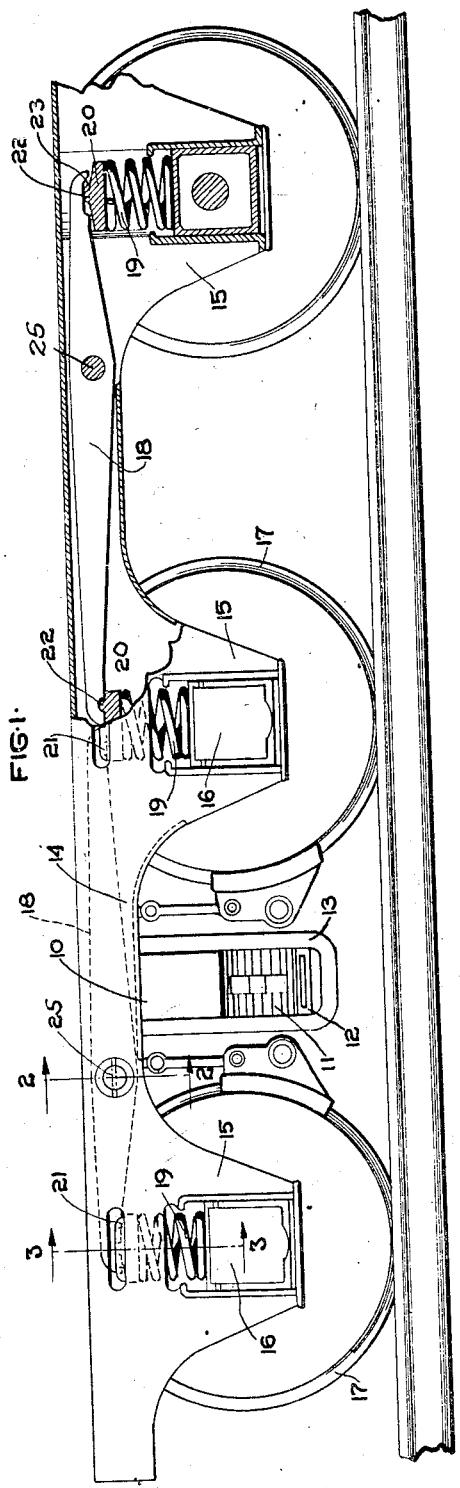
WITNESS:
R. H. Greist
INVENTOR:
CHARLES S. KNAPP
BY Cromwell, Greist & Warren
ATTYS.

Patented Apr. 15, 1924.

1,490,218

UNITED STATES PATENT OFFICE.

CHARLES S. KNAPP, OF CHICAGO, ILLINOIS, ASSIGNOR TO THE PULLMAN COMPANY, OF CHICAGO, ILLINOIS, A CORPORATION OF ILLINOIS.

EQUALIZER MOUNTING FOR CAR TRUCKS.

Application filed April 2, 1920. Serial No. 370,876.

*To all whom it may concern:*

Be it known that I, CHARLES S. KNAPP, a citizen of the United States, residing at Chicago, in the county of Cook and State of Illinois, have invented certain new and useful Improvements in Equalizer Mountings for Car Trucks, of which the following is a specification.

The present invention relates to car trucks and particularly to the mounting of the equalizer bar with reference to the frame and journal-boxes whereby to secure, in a high degree, an advantageous distribution of the weight to the several wheels while at the same time maintaining the brake shoes and their hanger connections readily accessible for inspection, adjustment and replacement.

Previous to the Berg type of truck as represented in Patent 1,220,170, granted March 27, 1917, it was customary in fourwheel and six-wheel car truck construction to make the equalizer-bars resting on the journal-boxes of a form having a depressed or bellied central portion, which style of bar has been necessary to provide sufficient space for the accommodation and reception of the equalizer-bar springs interposed between the truck frame wheel pieces and the equalizer-bars.

In six-wheel trucks of the Pullman type it had theretofore been inconvenient to use two brake shoes for each wheel, particularly for the inside of the outer wheels, because the various parts of such structure and more especially the equalizer-bars and springs prevented a ready replacement of worn shoes. To provide a truck arrangement in which the brake shoes on both sides of the wheels can readily be inspected has therefore been the aim and object of truck designers for some considerable time. Many of the forms of construction proposed have contemplated the entire elimination of the type of equalizer extending in one piece from journal-box to journal-box.

The Berg type of truck practically solved the problem by making the equalizer bar straight and forming a recess or pocket on the under side of the wheel piece of the truck frame for the accommodation of the springs, whereby the equalizer-bars and accessory parts were so placed as to permit access to the brake shoes for inspection, adjustment and replacement.

Later, minor inherent disadvantages of the Berg construction were remedied in the manner disclosed in the Parke and Knapp Patent No. 1,247,872 granted November 27, 1917, wherein greater stability was attained by the particular application of the equalizer spring to the bar and wheel piece of the truck.

Although, by the constructions of the above mentioned patents, the brake shoes were rendered readily accessible; the brake hangers and connections lay behind the equalizer-bar, the elevation of the latter being limited by the requirement of space between the bar and wheel piece for the mounting of the equalizer springs.

By the present invention, provision is made for disposing the equalizer-bar at a higher elevation, in substantially the horizontal plane of the wheel piece, mounting the bar directly on the frame and removing the spring bearing from between the bar and wheel piece to positions between the ends of the bar and the journal-boxes where the springs are guided above the boxes in oppositely disposed arcuate expanded portions of the side walls of the wheel piece.

In order that the invention in its application and operation may be readily understood, a preferred embodiment of the same is set forth in the accompanying drawings and in the following detailed description predicated thereon. The invention being susceptible of embodiment without restriction to the specific details shown and described, however, the drawing and description are to be taken in an illustrative and not in an unnecessarily limiting sense.

In the drawings—

Fig. 1 is a fragmentary side elevation of a car truck;

Fig. 2 is a vertical section on the line 2—2 of Fig. 1;

Fig. 3 is a vertical section on the line 3—3 of Fig. 1.

Having reference to the drawings in detail, the truck is shown as equipped with the truck bolster 10 supported at its opposite ends on leaf bolster springs 11 interposed between the truck bolster and the spring planks 12 and carried in hangers 13 supported by and pivotally hung on the truck frame 14. The wheel piece of the truck frame is shown as supplied with integral pedestals 15 cooperating with the journal-boxes 16 provided for the axles equipped with the car wheels 17.

At each side of the truck are arranged rigid equalizer-bars 18 bearing at their ends upon the journal-boxes through the mediation of coiled equalizer springs 19, and cap members 20 having longitudinally-extending upstanding flanges 21 and cross ribs 22 seated within under-recesses 23 of the equalizer-bar ends.

Each of the equalizer-bars is advantageously made of greater depth intermediate its ends at the point of connection between the bar and the truck frame to insure the proper distribution of strength and freedom of operation.

The wheel piece of the frame is hollow, affording a longitudinal cavity within which the equalizer-bar is housed, the opposed side walls of the wheel piece being of an arcuate expanded shape above each of the journal-boxes to provide a vertical guiding bore 24 for the spring 19 and cap member 20.

In order to insure the maintenance of a proper longitudinal and vertical relation between the bar and frame, and a free pivotal movement for the distribution of the weight from the frame to the journal-boxes, the equalizer-bar is pivotally mounted within the wheel piece by means of the pivot pin or bolt 25 extending through the bar and the side walls of the wheel piece.

It will be observed that by this construction an efficient equalization of the load distribution to the several wheels is attained in association with a disposition of the equalizer-bar above the space between adjacent wheels whereby access to the brake shoes, hangers and appurtenant connections is unobstructed.

I claim:

1. In a truck for railway vehicles, the combination with the journal-boxes, of a truck frame having a hollow wheel piece, an equalizer bar pivoted intermediate its ends within said hollow wheel piece, and springs mounted on said boxes for supporting thereabove the ends of the bar, said hollow wheel piece having its side walls arcuately expanded adjacent said springs whereby to provide vertical guides for the same.

2. In a truck for railway vehicles, the combination with the journal-boxes, of an equalizer bar spanning two of the boxes and pivoted intermediate its ends on the truck frame, springs mounted on said boxes for coaction with the ends of the bar, and spring-guiding means for positioning engagement with the springs throughout their lengths.

3. In a truck for railway vehicles, the combination with the journal-boxes, of an equalizer bar pivoted intermediate its ends on the truck frame, springs mounted on said boxes for coaction with the bar, and spring-guiding means for circumferential positioning engagement with the springs throughout their lengths.

4. In a truck for railway vehicles, the combination with the journal-boxes of an equalizer bar pivoted intermediate its ends to the truck frame, springs mounted on said boxes for coaction with the bar, and spring-guiding means rigid with the truck frame and independent of said bar and boxes for circumferential positioning engagement with the springs throughout their lengths.

5. In a truck for railway vehicles, the combination with the journal-boxes, of an equalizer bar pivoted intermediate its ends to the truck frame, springs mounted on said boxes, cap members disposed on said springs for supporting thereabove the ends of the bar, and means independent of said bar in circumferential positioning engagement with the caps and the springs throughout the axial lengths of the same for vertically guiding the caps and the springs.

In testimony whereof I have hereunto subscribed my name in the presence of two subscribing witnesses.

CHAS. S. KNAPP.

Witnesses:
G. R. DIXEY,
H. F. SEIDLER.